Patented Feb. 15, 1927.

UNITED STATES PATENT OFFICE.

SHUNJIRO TOMIOKA, OF TOKYO, JAPAN.

METHOD OF PRODUCING PAINTS FOR FISHING NETS.

No Drawing.  Application filed March 24, 1926. Serial No. 97,109.

This invention relates to improvements in paints and more particularly paints for fishing nets and method of manufacturing the paints.

An object of this invention is to produce paints of the class specified in a complete, proper and economical manner.

Another object of this invention is to obtain paints which can readily permeate into the fibrous material of fishing nets.

Another object of this invention is to obtain paints which can be dried out promptly.

A further object of this invention is to provide paints which can render fishing nets flexible, water-proof and antiseptic.

Other objects and particularities of the present invention will be fully and completely disclosed in the following description.

In practising this invention, sulphur and calcium oxide or lime are added to resin or vegetable tallow with a suitable proportion, and the mixture is heated to a suitable temperature. After the heating a quantity of boiled oil is added to the heated mixture, and the present novel paints produced.

In a preferred embodiment of this invention, the process substantially comprises three steps.

First, a quantity of copal or pine resin is heated to a melted state, and about 4% of lime and 10% of sulphur are added thereto, while the heating is continued.

Second, vegetable oil, such as linseed oil or Perilla-oil, and animal oil, such as of sardine or herring, are mixed with each other at a fifty-fifty proportion. The mixture is then added with 0.5% of lead oxide and 0.6% of manganese resinate, as drying agents, and then heated to a temperature about 260° C., for more than ten hours. There is then obtained an amount of thick boiled oil which is water-proof and can promptly dry out.

The first mentioned mixture and the boiled oil are then mixed with each other at a suitable proportion, for example, 40 parts of the mixture to 60 parts of the boiled oil. The last mentioned mixture is heated to a suitable temperature, and a novel paint thus obtained.

The paints produced according to this invention has been found to be readily permeable into the fibrous material of fishing nets, promptly driable, and flexible when dried out. The paints also has a considerable degree of water-proofness and antisepticity.

Although I have shown the invention in a particular embodiment thereof, it will be obvious to those skilled in the art that various variations and modifications may be made in the detailed processes and proportions of mixtures or other details, without departing from the spirit and scope of the invention.

Having now particularly described and ascertained the nature of this invention, and in what manner the same is to be performed, I declare that what I claim is:

The method of producing paints for fishing nets comprising adding about 4% of lime and 10% of sulphur to a quantity of copal in a melted state, mixing a quantity of linseed oil with an equal quantity of sardine oil, adding to the second mixture about 0.5% of lead oxide and 0.6% of manganese resinate, heating the third mixture to a temperature of about 260° C. for more than ten hours, mixing the first and third mixture with each other at a proportion of 40 to 60, and heating the last mentioned mixture.

In testimony whereof I affix my signature.

SHUNJIRO TOMIOKA.